(No Model.)
W. P. FOGARTY & A. C. KRUEGER.
BICYCLE TIRE.
No. 578,227. Patented Mar. 2, 1897.
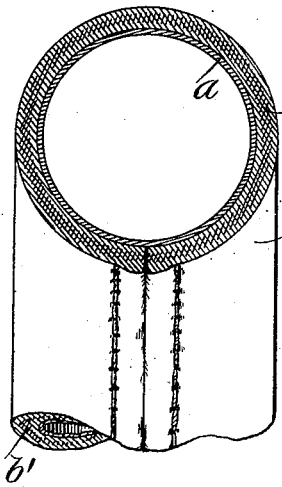
Fig. 1
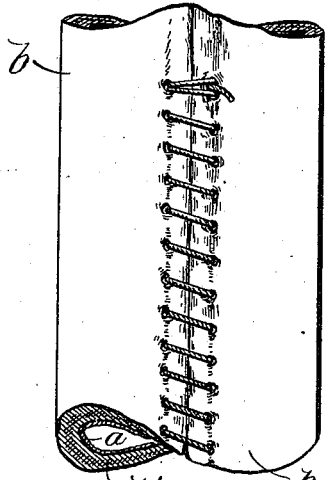
Fig. 2.
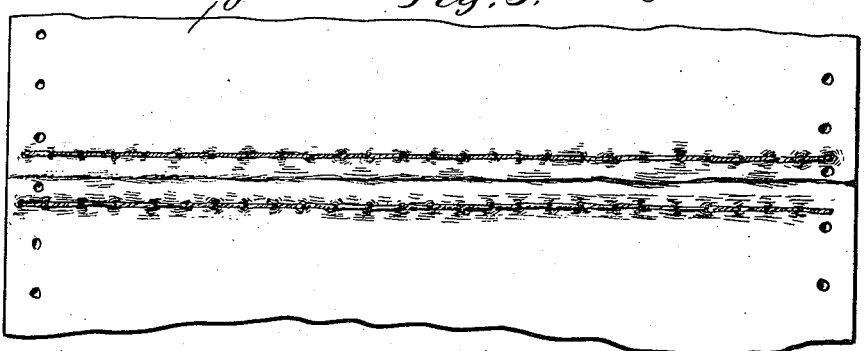
Fig. 3.
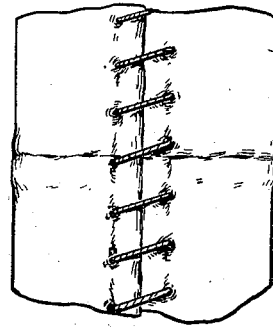
Fig. 4
Fig. 5
Witnesses:
DeWitt C. Tanner
W. Clyde Jones.
Inventors:
William P. Fogarty,
August C. Krueger,
By Barton & Brown
Attorneys.

UNITED STATES PATENT OFFICE.

WILLIAM P. FOGARTY AND AUGUST C. KRUEGER, OF CHICAGO, ILLINOIS.

BICYCLE-TIRE.

SPECIFICATION forming part of Letters Patent No. 578,227, dated March 2, 1897.

Application filed October 3, 1895. Serial No. 564,488. (No model.)

*To all whom it may concern:*

Be it known that we, WILLIAM P. FOGARTY and AUGUST C. KRUEGER, citizens of the United States, residing at Chicago, in the county of Cook and State of Illinois, have invented a certain new and useful Improvement in Bicycle-Tires, (Case No. 1,) of which the following is a full, clear, concise, and exact description, reference being had to the accompanying drawings, forming a part of this specification.

Our invention relates to a bicycle-tire, its object being to construct a leather tire having all of the advantages of rubber as regards resiliency while being impuncturable, and thus not subject to the great objection attendant upon the use of rubber tires.

In accordance with the present invention an interior rubber air-tube is employed and surrounded by a protecting-tube of leather. We have found that ordinary leather as usually tanned cannot be effectually employed for the protecting-tube, and we employ leather which has been surface-tanned only, a layer of rawhide being thus provided upon the interior in which the gluten or animal matter remains in its natural state. The presence of the interior layer of raw leather renders the tire practically impuncturable, as the raw leather is so tough as to prevent the puncturing of the tire by means of a pin, nail, or tack, even though special effort be made to produce the puncture. Furthermore, the layer of raw material imparts a resiliency to the tube which would not be present were the raw material absent and the leather completely tanned. Another advantange arising from the employment of the interior layer of raw material is that the leather tube thereby becomes waterproof. Should the tube be made of the usual tanned leather, the leather possesses such a porous structure that it readily absorbs water and soon becomes soggy and very materially increased in weight. Furthermore, leather completely tanned is more or less brittle in structure and does not possess the resiliency which the gluten or animal matter in its raw state imparts to the tube; nor, on the other hand, would a tube formed from rawhide or leather which had not been surface-tanned prove effective, as in this case the resiliency would be absent and the tube would be of considerable weight, weight being an item of prime consideration in the construction of a bicycle-tire.

We have found that bicycle-tires constructed in accordance with the present invention ride more smoothly than the usual rubber tires, since the vibration or quiver produced in a rubber tire by slight shocks or jars is totally absent in a tire constructed of leather in accordance with our invention.

The edges of the strip of leather forming the tire are brought together upon the inner side of the tire and may be stitched together, or removable lace may be employed. The ends of the tube may be cemented together or preferably sewed together by stitches upon the interior of the tube to form a butt-seam which forms a smooth surface upon the exterior of the tube.

We will describe our invention in connection with the accompanying drawings, in which—

Figure 1 is a view partially in section of a portion of a bicycle-tire embodying our invention. Fig. 2 is a view showing the manner of lacing the edges of the leather together. Fig. 3 is a view illustrating a portion of the tire rolled into a plane to show the manner of joining the ends of the tube together. Fig. 4 is a view showing the joint complete. Fig. 5 is a view illustrating the cement joint which may be employed.

Like letters refer to like parts in the several figures.

The rubber air-tube $a$ is surrounded by a leather tube $b$, the inner edges of the tube being stitched together, as shown in Fig. 1, or laced, as shown in Fig. 2. The leather of which the tube $b$ is formed is surface-tanned, whereby a layer $b'$ of raw leather is provided upon the interior, which renders the tire impuncturable, waterproof, and resilient.

In Figs. 2 and 3 the joint between the ends of the tube is illustrated. The ends of the strip of leather from which the tube is to be formed are first brought together and then stitched to form a butt-joint, the stitches thus being upon the face of the leather strip which is to lie upon the interior of the tube. The leather strip is then bent into tubular form and the edges stitched or laced together, as shown in Fig. 4. The ends of the tube thus rest closely in contact and form a neat joint, which renders the exterior of the tube practically smooth.

In Fig. 5 is illustrated a longitudinal section through a portion of the leather strip of which the tube may be formed, the ends of the strip being tapered for three or four inches from the end and cemented together.

The process of making the leather we employ may be briefly described as follows: The hides, after having been subjected to the process of depilation to remove the hair and scarf-skin and treated in a manner well known in the art to prepare the hides for tanning, are immersed for fourteen days in a tannin extract and then placed for a period of six days in an aqueous solution, 20° strong, having three parts of alum to one part of salt. The hides after being dried are then stuffed with a mixture composed of twenty parts of vegetable oil, five parts of beeswax, and one part of paraffin, which are mixed in a heated state.

We are aware that it has been proposed to form a bicycle-tire from two rubber tubes between which a layer of rawhide is inserted to render the tube impuncturable, and we disclaim such a construction. We also disclaim any construction wherein separate tanned and untanned skins are employed, the essential feature of our invention being the construction of a tire formed from a skin having the interior portion untanned, while the surface forming the tread of the tire is tanned.

Having described our invention, what we claim as new, and desire to secure by Letters Patent, is—

1. In a tire, the combination of an interior air-tube and an exterior covering for said tube, formed of hide, said hide being tanned upon the surface that forms the tread of the tire and provided with a portion underlying said surface which is untanned, substantially as and for the purpose specified.

2. In a tire, the combination of an interior air-tube and an exterior covering for said tube formed of hide, said hide being tanned upon the surface forming the tread of the tire and upon the surface resting against the air-tube, and provided with a central portion underlying and intervening between said surfaces which is untanned, substantially as and for the purpose specified.

In witness whereof we hereunto subscribe our names this 28th day of September, A. D. 1895.

WILLIAM P. FOGARTY.
AUGUST C. KRUEGER.

Witnesses:
W. CLYDE JONES,
DE WITT C. TANNER.